UNITED STATES PATENT OFFICE.

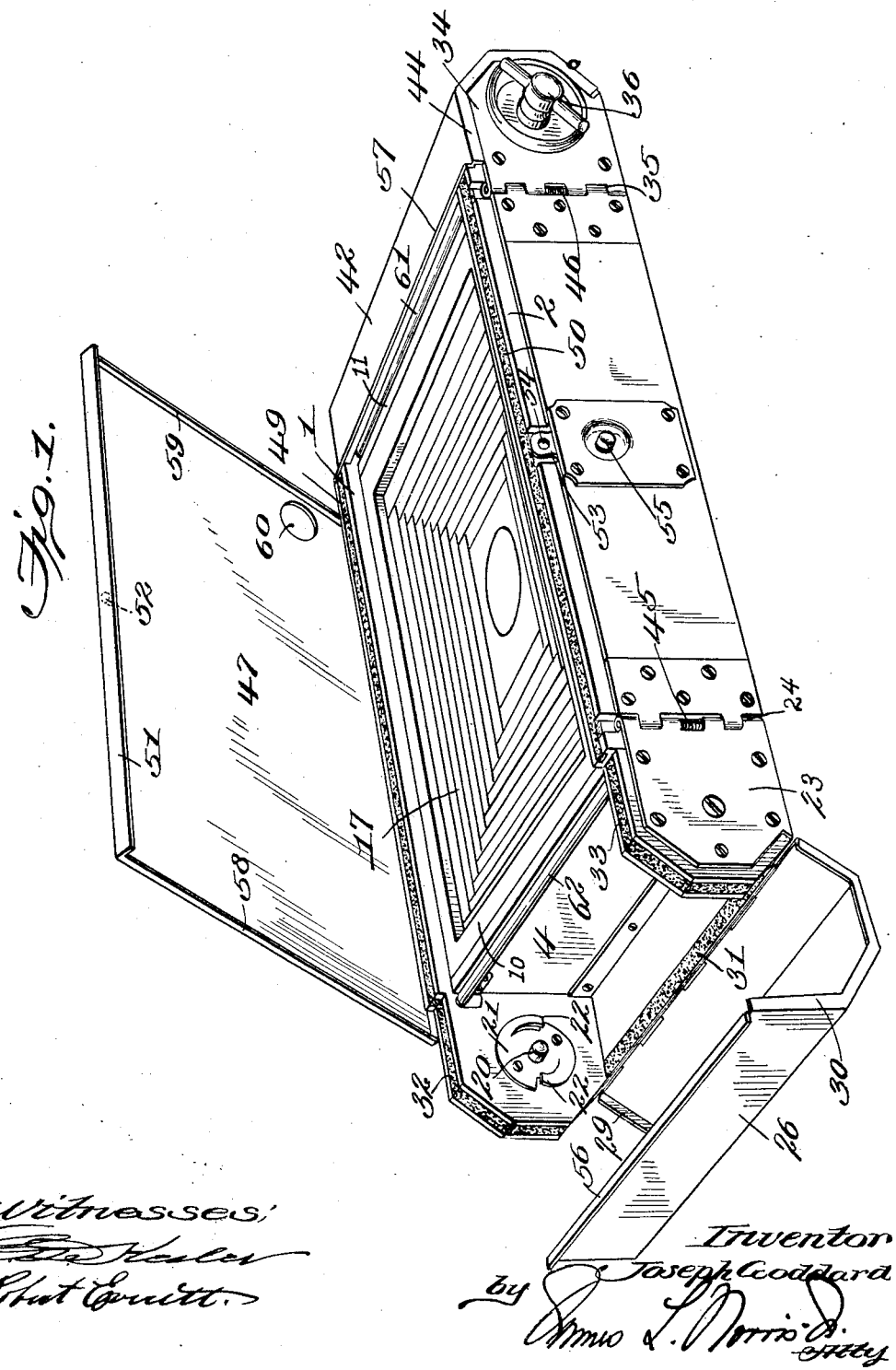

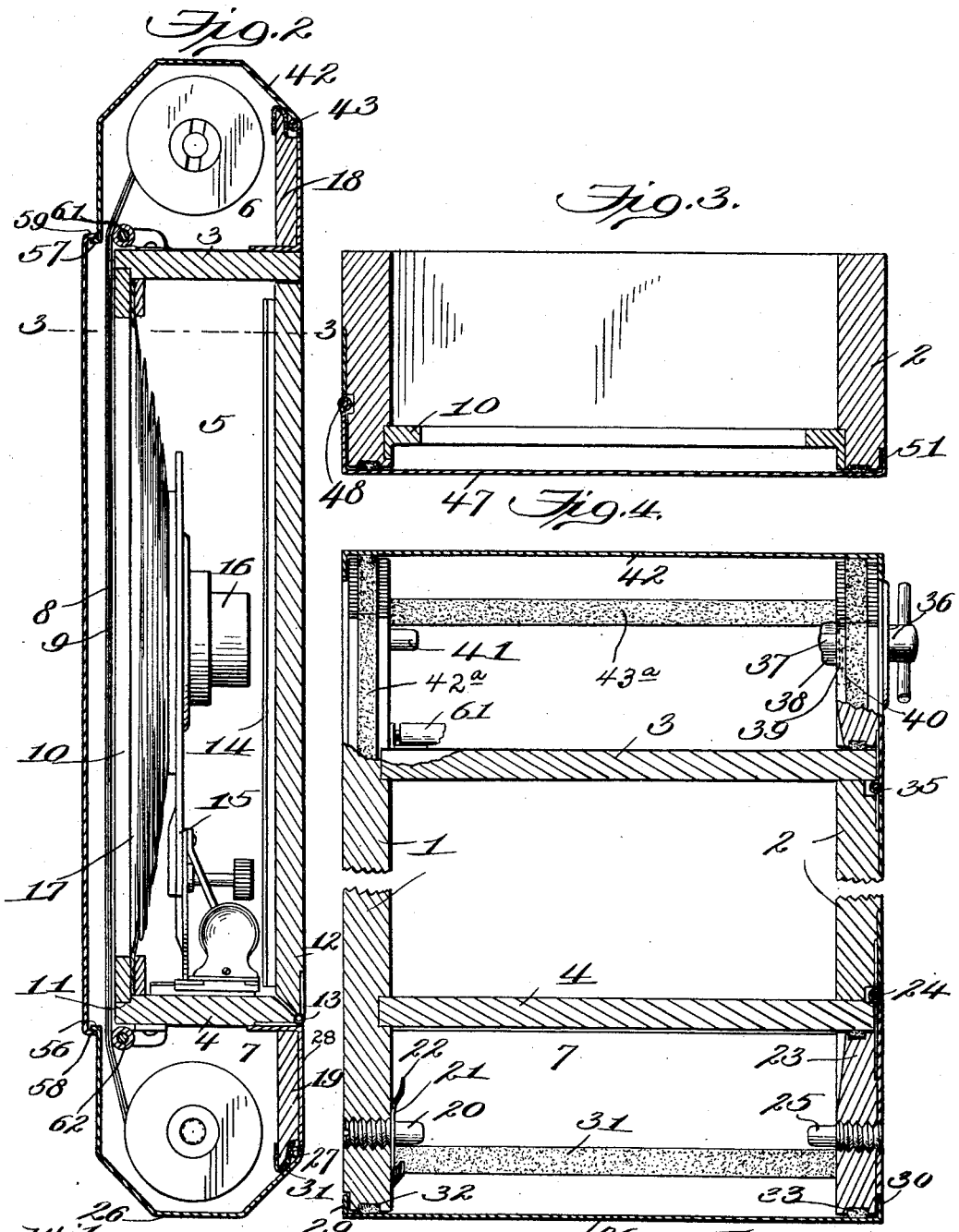

JOSEPH GODDARD, OF ROCHESTER, NEW YORK, ASSIGNOR TO SENECA CAMERA MANUFACTURING CO., OF ROCHESTER, NEW YORK, A CORPORATION OF NEW YORK.

PHOTOGRAPHIC CAMERA.

1,001,387.  Specification of Letters Patent.  Patented Aug. 22, 1911.

Application filed March 28, 1911. Serial No. 617,364.

*To all whom it may concern:*

Be it known that I, JOSEPH GODDARD, a citizen of the United States, residing at Rochester, in the county of Monroe and State of New York, have invented new and useful Improvements in Photographic Cameras, of which the following is a specification.

My present invention relates to improvements in photographic cameras and more particularly to the pocket folding type adapted to handle cartridges or spools of flexible film permitting daylight loading and unloading of the camera, and it is the primary object of the present invention to provide a generally improved camera of this type whereby the loading and unloading thereof may be accomplished with the greatest facility.

In the preferred embodiments of the invention the cartridges or spools are mounted and removed relatively to the camera by operating pivoted or otherwise movable members which carry the journals or spool-centering devices, the spool compartments are opened to render the spools accessible by pivoted or hinged end sections of the casing, and the back of the camera casing is closed by a door which coöperates with the end sections. The members which carry the spool-centering devices are preferably locked or retained in operative position by the movable end sections of the casing, and these end sections are locked or retained in closed position by the door, light-tight joints being formed between such parts. By providing this door with a lock, catch or other suitable fastening means, a single device may serve to lock or retain all of the parts mentioned in operative position and relation.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a camera constructed in accordance with one embodiment of my invention, one of the end sections of the casing and the rear door being open and the film-carrying spools removed; Fig. 2 represents a central longitudinal section of the camera with the parts thereof in operative position and the film and spools in condition for the exposing operation; Fig. 3 represents a transverse section of the camera on the line 3—3 of Fig. 2, the bellows, lens and associated parts and the door being omitted; and Fig. 4 represents a central vertical section of the camera as shown in Fig. 3, the spools and the middle portion of the camera being omitted.

Similar parts are designated by the same reference characters in the several views.

In the accompanying drawing, I have shown one embodiment of the invention wherein the camera casing is composed of a pair of side members 1 and 2 which are connected by the transverse partitions 3 and 4. One of the side members (the member 1 in the present instance) extends past the partitions 3 and 4 to the extreme ends of the casing while the side member 2 terminates at the partitions 3 and 4. These partitions divide the camera casing into a central or intermediate chamber 5 to contain the bellows, lens, and associated parts of the camera and end compartments 6 and 7 to accommodate the spools which coöperate with the film 8. The usual film cartridges may be used, a strip of opaque material 9 being used as a backing to protect the film and is wound with the film upon the spools. A frame 10 is fitted in a recess 11 at the rear of the central compartment 5 and serves to define the exposure opening, and the film lies closely against the rear face of this frame and in a flat condition. The front of the central compartment 5 is provided with a door 12 which also serves as a bed to adjustably support the lens. In the present instance, the lower edge of this door is pivotally connected to the bottom wall 4 of the central compartment and which is formed by the partition 4 through the medium of the hinge 13, and the door is provided with a track 14 to coöperate with a suitable lens front 15, the latter supporting the camera lens 16 which is connected to the usual extensible bellows 17. The door 12 may be retained in closed position by a catch, as usual.

The fronts of the spool compartments 6 and 7 are partly closed by boards 18 and 19 which extend outwardly from the partitions 3 and 4 and are fitted to the extended portions of the side member 1. Those portions of the side member 1 which project beyond the partitions 3 and 4 are provided with suitable journals or spool-centering devices. In the present instance, a stud 20 is secured in one of these extensions and a friction device 21 in the form of a plate having laterally bent springs 22 is provided for the stud 20 which is contained in the compartment 7, this compartment 7 being adapted to receive the cartridge and to permit the film to unwind therefrom as the different exposures are made. The opposite end of the compartment 7 which receives the cartridge is provided with a member 23 which is pivotally connected to the camera casing by a hinge 24 and this member carries a stud or spool-centering device 25 which is complemental to and arranged in alinement with the stationary stud or spool-centering device 20. The axis of the hinge 24 is preferably located at a point off-set inwardly with respect to the outer side of the partition 4 while the inner end of the member 23 is adapted to abut against the outer side of the partition 4 when the member 23 reaches an operative position. The cartridge is centered upon the studs 20 and 25 and when the member 23 is moved into operative position, it will produce a thrust upon the cartridge or spool and this thrust will result in a frictional engagement between the spring arms 22 and the adjacent end of the spool or cartridge, unwinding of the film from the cartridge or spool being thereby retarded for the purpose of maintaining an appropriate degree of tension upon the film.

The rear and outer sides of the compartment 7 are adapted to be closed by an end section 26 of the casing. This end section of the casing has a shape corresponding closely to the contour of the coöperating edges of the side member 1 and the spool-centering member 23, and the member 26 is pivotally connected to the camera casing by a hinge 27, one member 28 of which preferably overlaps the outer side of the board 19, and one end may be bent so as to be anchored between the inner end of the board 19 and the outer face of the partition 4. The axis of the hinge 27 which connects the end section to the casing is perpendicular to the axis of the hinge 24 which pivotally connects the member 23 to the casing so that these two parts are movable in right angular relation. The side edges of the section 26 are formed with turned flanges 29 and 30 which, when the section 26 is in closed position, overlap the edges of the side member 1 and the pivoted spool-centering member 23 respectively, the member 23 being thereby locked in operative position so that the cartridge or spool cannot be released while the section 26 is closed. A light-excluding seal 31 is preferably arranged at the inner side of the hinge 27 and similar light-excluding seals 32 and 33 are preferably fitted into those edges of the members 1 and 23 with which the section 26 coöperates, thereby insuring the film against exposure from light. The opposite end of the camera casing is provided with a member 34 which is pivotally connected to the camera casing by a hinge 35, and this member 34 carries a spool-winding device which may embody, for example, a handle 36 arranged on the exterior of the casing and having a stud shaft 37 which extends through the member 34 and is provided with a head 38 adapted to couple with and rotate the winding spool. To prevent retrograde motion of the winding spool, the stud shaft may be provided with a toothed wheel 39 and a coöperating pawl 40. A complemental spool-centering stud 41 is fitted in the side member 1 of the casing and in axial alinement with the winding device, the winding spool being introduced into the spool compartment 6 while the member 34 is swung into an inoperative position and, when the member 34 is returned to an operative position, the spool-winding device is operatively connected to the winding spool. The rear and outer sides of the spool compartment 6 are adapted to be closed by an end section 42 of the casing which is pivotally connected to the casing by a hinge 43 and conforms closely in shape with those edges of the members 1 and 34 with which this section coöperates, this section of the casing being also formed with inturned flanges 44 which coöperate with the members 1 and 34 respectively, and thereby lock the member 34 in operative position when the section 42 is closed, and a light-excluding seal 43ª for the hinge 43 and a seal 42ª for the joints between the section 42 and the coöperating edges of the members 1 and 34 may be provided, as shown in Fig. 4. Preferably, the members 23 and 34 which carry the spool-centering devices are provided with springs 45 and 46 which have a tendency to close and retain these members in closed positions, thereby preventing accidental displacement of the spools when the end sections 26 and 42 of the casing are opened.

The rear of the camera is adapted to be closed by a door 47, one edge of which is pivotally connected to the camera casing in the present instance by a hinge 48, and this door is adapted to bear against the rear edges of the side members 1 and 2. To insure the exclusion of light, light-excluding seals 49 and 50 may be fitted in the rear edges of the members 1 and 2 to coöperate with the door 47 when closed. The free edge of the door is also preferably provided with a forwardly directed flange 51 which, when the door is closed, overlaps the side member 2, and any suitable form of catch or lock may be provided to retain the door in closed position. In the present instance, the flange 51 of the door has an inwardly directed stud or projection 52 and the casing is provided with a spring 53 having an aperture 54 to coöperate with the stud or projection 52 when the door is closed. Unlocking of the door may be accomplished by depressing a button 55 which is attached to or operates upon the spring 53.

It will be noted from the foregoing description that the spool-centering members 23 and 34 are held or locked in operative position by the end sections 26 and 42 when the latter are closed. According to the present invention, the end sections 26 and 42 are also locked or held in closed and operative position by the door 47 when the latter is closed so that a single catch for the door will serve to retain the several operative parts of the camera in proper position. For this purpose, the rear free edges of the end sections 26 and 42 of the casing are provided with rearwardly extended flanges 56 and 57, and the corresponding edges of the door are formed with forwardly directed flanges 58 and 59. When the sections 26 and 42 are in closed positions, the door 47 may be closed and, as the door moves into closed position, the flanges 58 and 59 thereon will coöperate with the flanges 56 and 57 respectively of the end sections, thereby locking or retaining the latter in closed operative positions. The door 47 may be provided with a sight aperture 60 through which the usual exposure-indicating numerals on the opaque backing of the film may be observed and utilized by the operator in the positioning of the film for each exposure. Guide rollers 61 and 62 may also be provided in the spool compartments 6 and 7 to facilitate a proper feeding of the film past the field of the lens.

I claim as my invention:—

1. In a photographic camera, the combination of a casing having a spool compartment, a member movable to carry a spool-centering device thereon to and from operative position with respect to a spool in said compartment, and a closure for said compartment movably connected to said casing and coöperative with said member to retain the latter in operative position.

2. In a photographic camera, the combination of a casing having a spool compartment, spool-centering devices one of which is movable relatively to the other, and a closure for said compartment hinged to said casing and coöperative with the movable spool-centering device to retain the latter in coöperative relation with the other spool-centering device.

3. In a photographic camera, the combination of a casing having a spool compartment, spool-centering devices one of which is movable to and from operative position with respect to the other, and a part hinged to said casing on an axis parallel to the length of the spool compartment controlling access to said compartment, said part also being coöperative with the movable spool-centering device to retain the latter in operative position.

4. In a photographic camera, the combination of a casing having a spool compartment, spool-centering means embodying a movable member carrying a spool-centering device, and an end closure for the casing pivotally connected thereto and controlling access to said compartment, said closure also being coöperative with said member to retain the latter and its spool-centering device in operative position.

5. In a photographic camera, the combination of a casing having a spool compartment at one end thereof, spool-centering means embodying a pivoted member carrying a spool-centering device, and a casing section pivotally connected to the casing and adapted to close said compartment, said section being coöperative with said member to lock the latter in operative position.

6. In a photographic camera, the combination of a casing having a spool compartment, spool-centering means including a member pivotally connected to the casing and carrying a spool-centering device, and a casing section pivotally connected to the casing and adapted to close said compartment, said section having a flange to coöperate with said member and thereby lock the latter in operative position when said section is in closed position.

7. In a photographic camera, the combination of a casing having spool compartments toward the ends thereof and a central compartment between them, movable members for said spool compartments and carrying spool-centering devices, and means controlling access to the central compartment and also common to said members for retaining them in operative position.

8. In a photographic camera, the combination of a casing having a pair of spool compartments, casing sections adapted to close said compartments and providing means of access thereto, and means common to said sections and coöperative therewith to retain them in closed position, said means being movable independently of said casing section.

9. In a photographic camera, the combination of a casing having a central compartment and spool compartments at the ends thereof, movably mounted casing sections adapted to close said spool compartments and providing means of access thereto, and a door for closing the central compartment, said door being coöperative with the casing sections to retain the latter in closed position.

10. In a photographic camera, the combination of a casing having spool compartments, spool-centering means for said compartments including a movable member carrying a spool-centering device, closures for said compartments providing means of access thereto and coöperative with the respective members to retain the latter in closed position, and a rear door for the casing common to and coöperative with said closures to retain the latter in closed position.

11. In a photographic camera, the combination of a casing having spool compartments, spool-centering means for said compartments including movably mounted members carrying spool-centering devices, casing sections movably connected to the casing and providing means of access to the respective compartments, said sections when closed being coöperative with said members to retain them in operative position, a door coöperative with said sections to retain them in closed position, and means for retaining said door in closed position.

12. In a photographic camera, the combination of a casing having spool compartments at opposite ends, casing sections pivotally connected to the casing and controlling access to said compartments, said sections being formed with flanges, and a door movably connected to the casing and having flanges coöperative with those of the casing sections to lock the latter in closed position.

In testimony whereof I have hereunto set my hand in presence of two subscribing witnesses.

JOSEPH GODDARD.

Witnesses:
F. K. TOWNSEND,
N. A. BRANNIGAN.

Copies of this patent may be obtained for five cents each, by addressing the "Commissioner of Patents, Washington, D. C."